US011860922B1

(12) United States Patent
Sojobi et al.

(10) Patent No.: US 11,860,922 B1
(45) Date of Patent: Jan. 2, 2024

(54) TAGGING DOCUMENTS TO DISPLAY WITH CONTEXT SENSITIVITY FOR IMPROVED USER EXPERIENCE

(71) Applicant: INTUIT INC., Mountain View, CA (US)

(72) Inventors: Ola Sojobi, San Diego, CA (US); Stephanie Shehi, Santee, CA (US)

(73) Assignee: INTUIT, INC., Mountain View, CA (US)

( * ) Notice: Subject to any disclaimer, the term of this patent is extended or adjusted under 35 U.S.C. 154(b) by 272 days.

(21) Appl. No.: 16/051,677

(22) Filed: Aug. 1, 2018

(51) Int. Cl.
*G06F 16/38* (2019.01)
*G06F 16/48* (2019.01)
*G06F 16/955* (2019.01)
*G06F 40/174* (2020.01)

(52) U.S. Cl.
CPC ............. *G06F 16/38* (2019.01); *G06F 16/48* (2019.01); *G06F 16/9566* (2019.01); *G06F 40/174* (2020.01)

(58) Field of Classification Search
CPC ........ G06F 16/38; G06F 40/174; G06F 16/48; G06F 16/9566; G06F 16/9655
USPC ........................................................ 707/737
See application file for complete search history.

(56) References Cited

U.S. PATENT DOCUMENTS

| 7,966,561 B1* | 6/2011 | Nguyen | G06Q 40/00 715/224 |
| 2014/0129942 A1* | 5/2014 | Rathod | H04N 21/44226 715/720 |
| 2018/0246983 A1* | 8/2018 | Rathod | G06F 40/186 |

* cited by examiner

*Primary Examiner* — Hosain T Alam
*Assistant Examiner* — Tracy M McGhee
(74) *Attorney, Agent, or Firm* — Patterson + Sheridan, LLP

(57) ABSTRACT

Certain aspects of the present disclosure provide techniques for improving a user experience of an application. Embodiments include receiving, from a user and via a user interface, a request for informational content related to a step in a workflow within the application. Embodiments include determining an identifier associated with the step. Embodiments include retrieving a reference document based on the request. Embodiments include accessing metadata associated with the reference document to identify context information associated with the identifier. Embodiments include displaying a portion of the reference document to the user within the user interface based on the context information, wherein the portion of the reference document comprises the informational content.

20 Claims, 5 Drawing Sheets

310 http://usf.gov/instructions/corporatetax.pdf#identifier=01A

Line 1. Gross Receipts or Sales

Line 1a. Gross receipts or sales.
Enter on line 1a gross receipts or sales from all business operations, except for amounts that must be reported on lines 4 through 10.
　　Special rules apply to certain income, as discussed below.

method
interest
corpora
the inte
(3). Re
schedu

*Non
service*
corpora

TAGGING DOCUMENTS TO DISPLAY WITH CONTEXT SENSITIVITY FOR IMPROVED USER EXPERIENCE

INTRODUCTION

Aspects of the present disclosure relate to techniques for using tagged documents to improve a user experience. In particular, embodiments described herein involve tagging documents to display with context sensitivity for an improved user experience.

BACKGROUND

Applications often provide users with informational content to assist with use of the application. For example, users may access help content, tutorials, or descriptive information relating to aspects of an application, such as particular workflows within the application. In certain applications, informational content is provided within a user interface associated with the application, and can be accessed by users through interactions with the user interface.

Providing informational content to users of an application within a user interface generally requires the informational content to be prepared and formatted in a manner that is compatible with the user interface. This may involve a substantial amount of work for individuals involved with preparing the informational content. Certain informational content may be based on outside sources of information, such as official documents, regulations, and other sources of information that are separate from the application. For example, financial services applications may provide users with informational content that is based on official sources, such as government-provided instructions or regulations. The process of manually generating informational content based on outside sources of information may involve a substantial amount of time and effort, and may potentially introduce errors into the informational content. Further, the outside sources may change their information frequently, which creates an ongoing data validation and synchronization issue. Additionally, providing informational content to users as plain text in a help window may not be an easily readable or efficient format for displaying certain types of information.

Accordingly, there is a need in the art for providing dynamic access to informational content within user interfaces to users of applications.

BRIEF SUMMARY

Certain embodiments provide a method for improving a user experience of an application through context-sensitive display of reference documents. The method generally includes receiving, from a user and via a user interface, a request for informational content related to a step in a workflow within the application; determining an identifier associated with the step; retrieving a reference document based on the request; accessing metadata associated with the reference document to identify context information associated with the identifier; displaying a portion of the reference document to the user within the user interface based on the context information, wherein the portion of the reference document comprises the informational content.

Other embodiments provide a non-transitory computer-readable medium comprising instructions that, when executed by one or more processors, cause the one or more processors to perform a method for improving a user experience of an application through context-sensitive display of reference documents. The method generally includes receiving, from a user and via a user interface, a request for informational content related to a step in a workflow within the application; determining an identifier associated with the step; retrieving a reference document based on the request; accessing metadata associated with the reference document to identify context information associated with the identifier; displaying a portion of the reference document to the user within the user interface based on the context information, wherein the portion of the reference document comprises the informational content.

Other embodiments provide a system comprising one or more processors and a non-transitory computer-readable medium comprising instructions that, when executed by the one or more processors, cause the one or more processors to perform a method for improving a user experience of an application through context-sensitive display of reference documents. The method generally includes receiving, from a user and via a user interface, a request for informational content related to a step in a workflow within the application; determining an identifier associated with the step; retrieving a reference document based on the request; accessing metadata associated with the reference document to identify context information associated with the identifier; displaying a portion of the reference document to the user within the user interface based on the context information, wherein the portion of the reference document comprises the informational content.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 3 depicts an example embedded browser for context-sensitive display of reference documents for an improved user experience.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
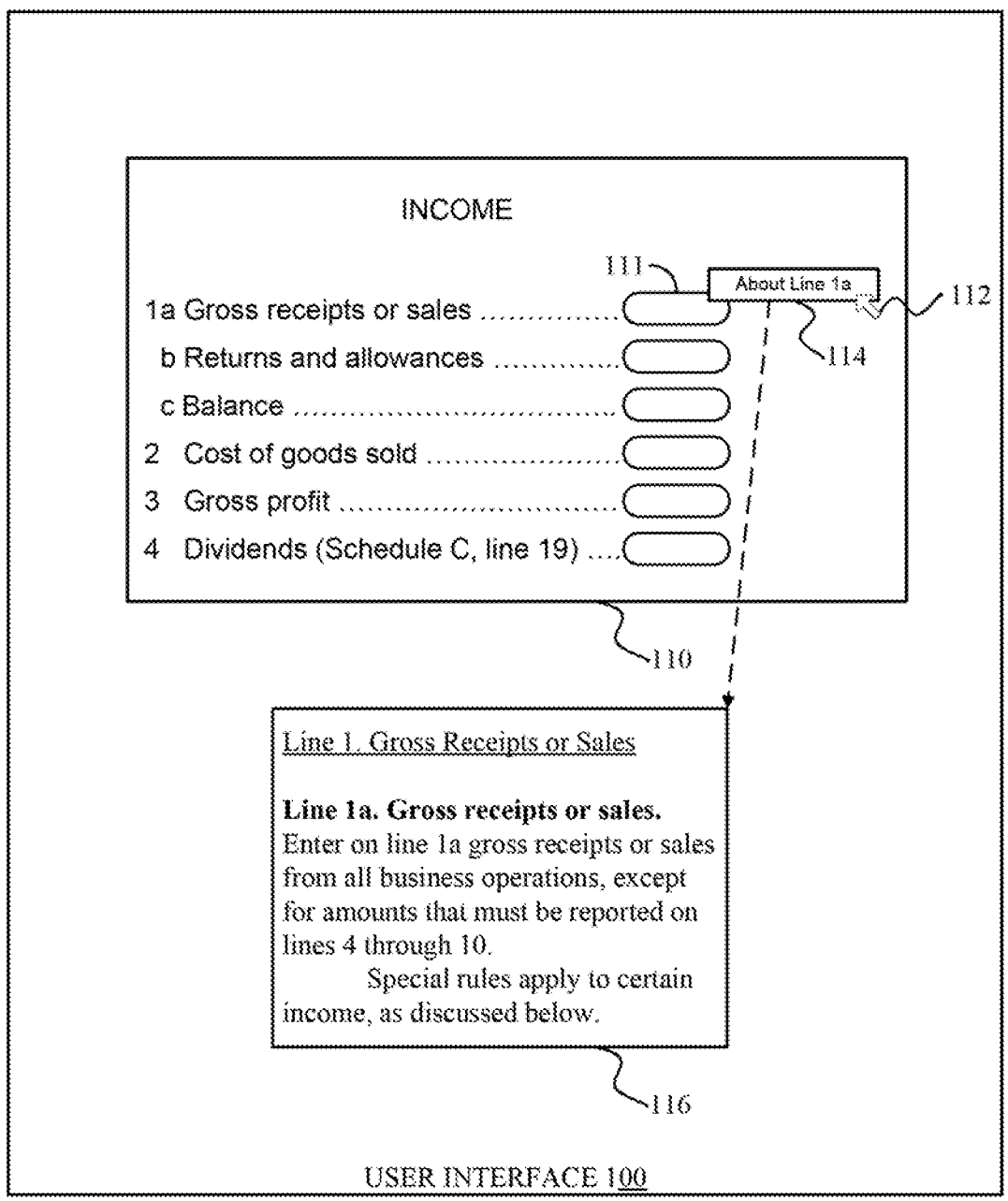
FIG. 1 depicts an example user interface for context-sensitive display of reference documents for an improved user experience.

Aspects of the present disclosure provide apparatuses, methods, processing systems, and computer readable mediums for improving a user experience of an application.

Computing applications often provide users with informational content related to use of the application. In some cases, informational content is based on an original source, such as instructions provided by an organization or governmental entity. Generating informational content in a format compatible with an application based on an original source can be time-consuming, can introduce errors into the informational content, and may not result in the most readable or efficient format for presenting certain types of informational content to users. Additionally, the application provider must continually monitor the original source for changes or addition to the informational content. Accordingly, embodiments of the present disclosure involve tagging reference documents (e.g., original sources) to allow the documents to be referenced dynamically so that portions of the documents may be displayed based on context for an improved user experience.

As used herein, "reference document" refers to a document that is a source of reference information that may be related to aspects of an application, such as its use, function, etc. In some cases, reference documents may be created and maintained separate (i.e., externally) from an application. For example, reference documents may include documents produced by third parties, such as government-provided instructions for filling out tax forms In other cases, reference documents may be a part of an application, or internal to an organization providing the application, such as a "help" or instructional documents associated with the application. In either case, i.e., where the reference document is external or internal to an associated application, the reference document may be readily accessible, but not editable. For example, such reference documents may be "read-only" and thus not embeddable with application-specific data, such as metadata.

In certain embodiments, a document, such as a reference document, is tagged (e.g., via a user or agent associated with an application, such as an employee of a provider of the application) via metadata that maps identifiers to context information within the document that identifies locations or "destinations" within the document. For example, context information may include things such as a page number, position coordinates (e.g., x and y coordinates), and zoom percentage to specific locations in the document. In one example, a document comprises instructions provided by a governmental entity for completing a particular tax form. Metadata associated with the document (e.g., stored in a file that is separate from but associated with the document) is created in order to tag destinations in the document with identifiers. The metadata includes identifiers associated with fields in the tax form. Each identifier is mapped in the metadata to context information, the context information identifying a destination in the document that includes instructions related to the field associated with the identifier. For example, a field in the tax form may be associated with an identifier of "Field01". The metadata for the document includes a mapping of the identifier "Field01" to context information (e.g., a particular page number, x and y coordinates, and zoom percentage) for displaying a portion of the document that includes instructions for completing the field named "Field01".

It is noted that "tagging" generally refers to operations related to creating metadata that associates destinations in the document (e.g., destinations defined by context information) with identifiers. Tagging does not generally involve modifying the document itself, but results in metadata that may be separate from the document. Tagging of a document may be performed manually based on a review of the contents of the document, such as by an agent associated with the application (e.g., an employee of an organization that provides the application). For documents that are updated regularly, such as reference instructions or regulations, metadata may be updated at regular intervals to ensure that the metadata corresponds to the latest version of the document.

In certain embodiments, metadata for a document may be produced automatically based on analysis of the document. For example, optical character recognition (OCR) techniques may be used to identify the contents of portions of the document, and metadata may be generated that associates context information for each portion of the document with an identifier that relates to the contents of the portion of the document. For instance, OCR techniques may be used to identify that a portion of a document contains instructions related to completing a particular field of a tax form. As such, metadata may automatically be generated that associates a page number, position coordinates, and zoom percentage of the portion of the document with an identifier that relates to the field of the tax form, such as the number or name of the field.

During use of an application, a user may request information related to completing a particular step in a workflow. For example, the workflow may be completing the tax form, and the step may be completing the field named "Field01". The user may request the informational content by clicking on a user interface element, such as an item on a menu (e.g., a menu may include an "about Field01" or "help" menu item for the user to select). The request includes the identifier associated with the step in the workflow about which the user is requesting informational content, which in this example is "Field01". The identifier is used to retrieve the document and access the document's metadata to identify the context information associated with the identifier. The context information is used to display the portion of the document to the user via the user interface of the application. For example, the page number is navigated to, and a field of view is selected based on the location identified by the x and y coordinates and the zoom percentage identified in the context information. The portion of the document is displayed in the format of the original source, as it is actually the original document that is being displayed rather than informational content generated based on the original document. In one embodiment, the portion of the document is displayed in an embedded browser within the user interface, and the user is enabled to scroll to other parts of the document. The user may be provided with the option of printing the document in its original format and/or copying text from the document.

Presenting the user with the portion of the document that includes the informational content requested by the user may assist the user in completing the step of the workflow, such as completing a field of a tax form. For example, providing the user with only the relevant portions of instructions from a governmental entity in the original format of the instructions allows for the user to receive efficient, targeted, and accurate informational content in a readable format.

Techniques described herein constitute an improvement with respect to conventional industry practices, such as manually generating informational content based on original sources to provide to users of a particular application, as they avoid the time, cost, potential for errors, and readability issues that may be introduced by such practices. Tagging documents in their original format with metadata for displaying the documents with context sensitivity within an application allows for informational content to be provided in an efficient, readable, and accurate manner to users of the application. Embodiments of the present disclosure provide a solution that improves a user experience of an application by providing limited information to a user that is relevant to a particular application state, that is presented in a format well-suited to the information, and that is accurate.

Example User Interface

FIG. 1 illustrates an example user interface 100 for context-sensitive display of reference documents for an improved user experience.

User interface 100 may be associated with a service, such as a conventional software application, web application, or some other software service that provides functionality related to one or more documents for consumers of the service. For example, user interface 100 may be associated with a financial services application, such as a financial management or tax preparation application, that allows users of the application to perform workflows related to finances.

User interface includes a form 110 that allows a user to provide information related to income. It is noted that, while user interface 100 is depicted as including financial information, embodiments of the present disclosure are not limited to financial applications. Form 110 includes a number of fields, such as field 111, associated with the text "la Gross receipts or sales", to be completed by the user. For example form 110 may be a form for reporting tax information to a governmental entity. The user may interact with form 110 using cursor 112, such as by clicking on fields and typing in values.

Menu item 114 may be displayed in response to an action by the user, such as "right clicking" with cursor 112 on field 111, which causes informational content to be displayed. For example, here the user requests informational content related to field 111 by clicking with cursor 112 on menu item 114, which includes the text "About Line 1a".

Field 111 may be associated with an identifier indicating that it is associated with line 1a in form 110. In one example, the identifier is used to retrieve a document (e.g., a reference document) that comprises instructions from the governmental entity for completing form 110. Metadata associated with the document is accessed, and the identifier is used to retrieve context information that is associated with the identifier in the metadata. The context information may relate to a portion of the document that includes instructions for completing line 1a of form 110.

The portion of the reference document is displayed within user interface component 116 according to the context information. User interface component 116 may be a portion of user interface 100, such as an embedded browser within user interface 110. The user may use the instructions in the portion of the document shown in user interface component 116 to assist in completing field 111 of form 110. In certain embodiments, user interface component 116 may allow the user to scroll (e.g., side-to-side and up-and-down) to view the rest of the document. The user may also be enabled to print and/or copy the portion of the document shown in user interface component 116 or the entire document.

It is noted that, while certain types of data and certain layouts are shown with respect to user interface 100 in FIG. 1, other types of data and user interface layouts may be used without departing from the scope of the present disclosure. For example, techniques described herein are not limited to the context of financial applications and documents related to financial management.

Example Metadata for Context-Sensitive Display of Reference Documents

Figure 2:
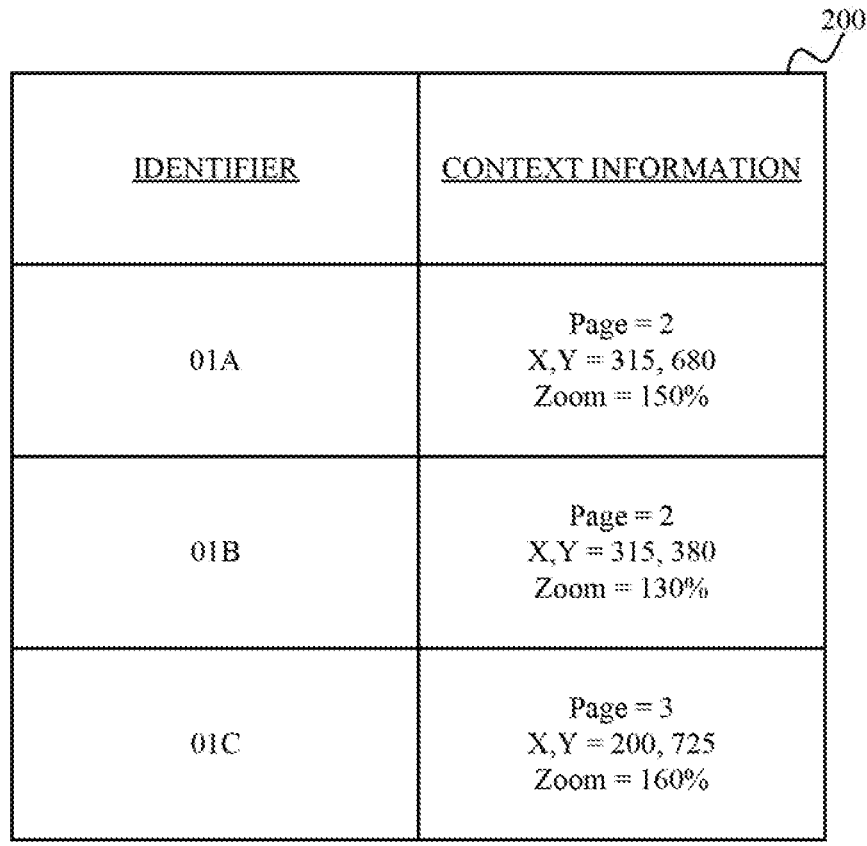
FIG. 2 depicts example metadata for context-sensitive display of reference documents for an improved user experience.

FIG. 2 depicts example metadata 200 for context-sensitive display of reference documents for an improved user experience. For instance, metadata 200 may be used to display a portion of a document within user interface component 116 of user interface 100 of FIG. 1 upon a request from a user for informational content.

Metadata 200 may, for example, be associated with a reference document that contains informational content related to completing fields of a form, such as form 110 of FIG. 1. In certain embodiments, metadata 200 is stored in a separate file that is associated with the document, such as in a file that is stored with the application (e.g., the metadata may be part of the application's internal data that is stored locally to the application).

Metadata 200 includes a plurality of identifiers. 01A, 01B, and 01C are included as examples of identifiers that correspond to fields on a form for which the document provides instructions. Each identifier is mapped to context information that includes a page number, x and y coordinates, and a zoom percentage for displaying a portion of the document that includes instructions related to the identifier. For example, the identifier 01A is mapped within metadata 200 to a page number of 2, x and y coordinates of 315 and 680, and a zoom percentage of 150%. This context information indicates that the portion of the document that relates to the form field identified by "01A" is located on page 2, at x and y coordinates of 315 and 680, and at a zoom percentage of 150%.

X and y coordinates may, for example, describe a number of pixels relative to the bottom left corner of the page. For instance, x, y coordinates of 315, 680 indicate a location that is 315 pixels from the left side of the page and 680 pixels from the bottom of the page. In other embodiments, the pixel offset may be from different corners of a document, from the center, etc.

Zoom percentage values may indicate an amount of zoom that should be used to display the portion of the document. For example, a zoom percentage of 150% indicates that the field of view for the page should be zoomed in to 150% within the user interface.

It is noted that the values and structure shown with respect to metadata 200 are only included as an example, and other values and structures may be used. Furthermore, other types of context information than those shown, such as links to documents or document locations, may be included in metadata 200.

Example User Interface Component

FIG. 3 depicts an example embedded browser 300 for context-sensitive display of reference documents for an improved user experience. For example, embedded browser 300 may be representative of user interface component 116 as shown and described with respect to FIG. 1.

Embedded browser 300 may be included within a user interface associated with an application, and may display a portion of a document comprising information content requested by a user. For example, embedded browser 300 displays a portion of a reference document comprising instructions related to completing field 111 of form 110 of FIG. 1.

Embedded browser 300 includes a uniform resource locator (URL) 310 that is used to retrieve the portion of the document. URL 310 depicts one particular technique by which embodiments of the present disclosure may be performed. URL 310 is generated based on the request from the user for the informational content, and includes a locator for the document (usf.gov/instructions/corporatetax.pdf) and a parameter for the identifier (#identifier=01A). URL 310 is used to retrieve the document from the location identified by the locator. For example, the document may be retrieved from the location usf.gov/instructions/corporatetax.pdf. Metadata associated with the document is also retrieved. For example, the metadata may be retrieved from locally stored application files based on the filename of the document (e.g., the metadata may be stored in association with the filename of the document or another identifier of the document, such as in separate mapping data or within the metadata). The metadata may, for example, be metadata 200 of FIG. 2. The parameter for the identifier (e.g., #identifier=01A) is further used to retrieve context information from the metadata so that the portion of the document identified by the context information may be displayed within embedded browser 300. For instance, the identifier 01A is mapped within metadata 200 of FIG. 2 to a page number of 2, x and y coordinates of 315 and 680, and a zoom percentage of 150%, and so these values are retrieved as the context information. The context information is then used to display the portion of the document within embedded browser 300. While URL 310 is depicted as including a web address (usf.gov/instructions/corporatetax.pdf) as an example, it is noted that the document may alternatively be stored locally, and URL 310 may, in some embodiments, comprise a local storage location (e.g., C:/Application/Documents/corporatetax.pdf).

Figure 4:
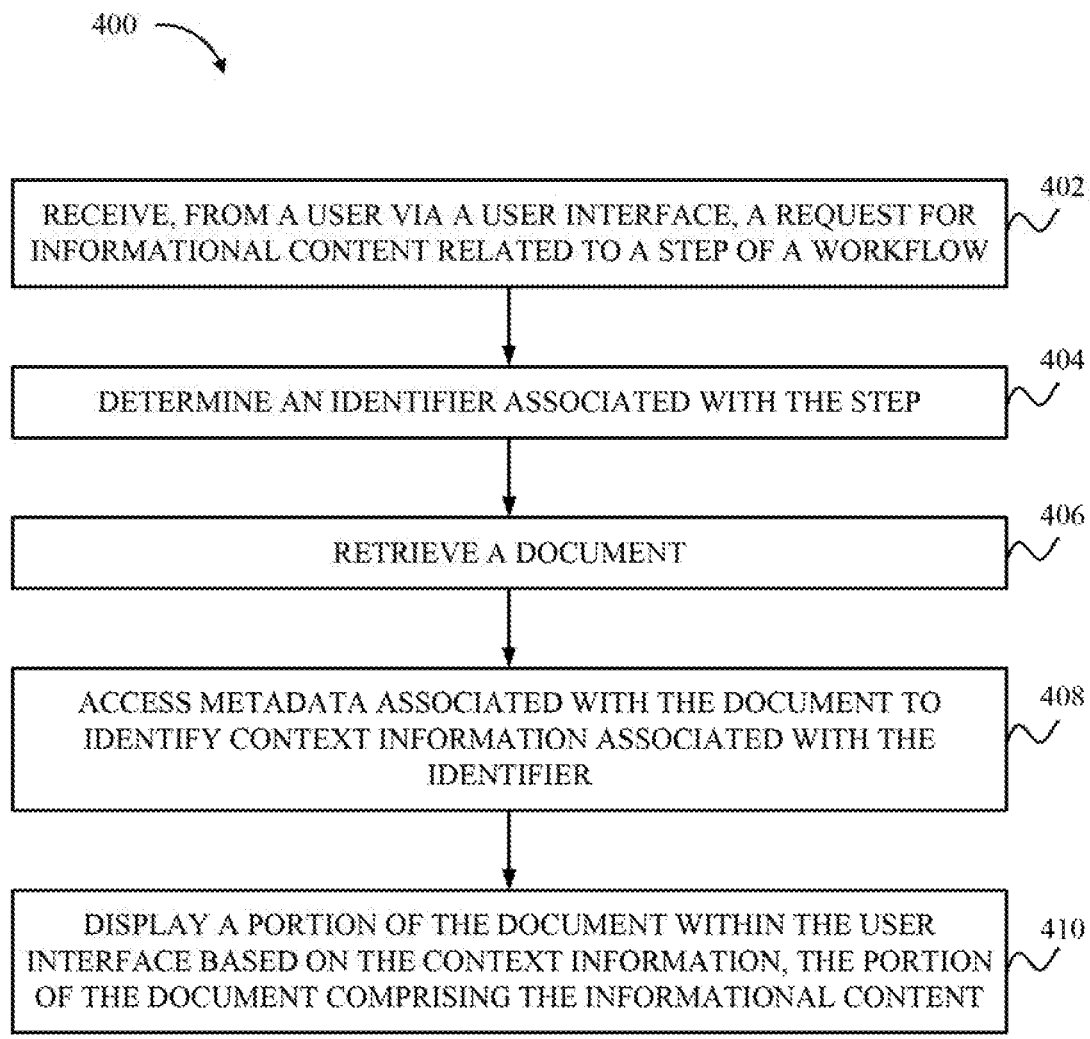
FIG. 4 depicts example operations for context-sensitive display of reference documents for an improved user experience.

FIG. 4 depicts example operations 400 for context-sensitive display of reference for an improved user experience. For example, operations 400 may be performed by an application associated with user interface 100 as shown and described with respect to FIG. 1.

At step 402, a request for informational content related to a step in a workflow is received from a user via a user interface. For example, the request may relate to completing a field of a tax form within the user interface of the application.

At step 404, an identifier associated with the workflow step is determined. For example, the identifier may be included with the request received at step 402, and may identify the field of the tax form about which the user requested information content.

At step 406, a document is retrieved. For example, the document may comprise the informational content, and may be retrieved based on the request (e.g., using the identifier). In certain embodiments, locally stored application data includes mapping information that maps identifiers to documents (e.g., filenames and/or storage locations of documents) and/or metadata for documents (e.g., filenames and/or storage locations of the metadata), and the mapping information is used to retrieve the document based on the identifier.

At step 408, metadata associated with the document is accessed in order to identify context information associated with the identifier. In some embodiments, the metadata is retrieved based on mapping information that maps the metadata to the document and/or to the identifier. The metadata may include an association between the identifier and the context information, which may include information for displaying a portion of the document that includes the informational content. In some embodiments, the context information includes a page number, position coordinates, and zoom percentage for the portion of the document.

At step 410, a portion of the document comprising the informational content is displayed within the user interface based on the context information. For example, the context information may be used to navigate to the portion of the document that includes the information content, and to set a field of view that allows the user to view the information content. The user may be provided with user interface elements, such as scroll bars and zoom controls that allow the user to view other portions of the document. In some embodiments, the user is also provided with user interface elements that allow the user to copy text from the document and print the document.

It is noted that operations 400 are only included as an example, and other sets of operations may be performed without departing from the scope of the present disclosure.

Though not depicted, method 400 may further include navigating to a page of the document associated with the page number and choosing a field of view for displaying the page based on the position coordinates and the zoom percentage.

Though not depicted, the document in method 400 may comprise instructions produced by an official entity related to the step, and the portion of the document may be displayed in an original document format provided by the official entity.

Though not depicted, method 400 may further include receiving, from the user and via the user interface, a request to print the informational content and printing the document in the original document format provided by the official entity.

In some examples, the workflow of method 400 is related to completing a form related to a governmental entity, and the step of the workflow comprises a field of the form. The document of method 400 may comprise instructions provided by the governmental entity related to completing the form, and the portion of the document may comprise instructions related to the field.

Though not depicted, method 400 may further include generating a uniform resource locator (URL) based on the identifier and using the URL to display the portion of the document within an embedded browser of the user interface, wherein the portion of the document is determined based on the context information associated with the identifier.

In some examples, an apparatus, including a memory comprising executable instructions and a processor in data communication with the memory and configured to execute the executable instructions, may be configured to cause the apparatus to perform a method for displaying documents with context sensitivity for an improved user experience, such as method 400 (or any combination of the steps described above with respect to method 400).

In some examples, a non-transitory computer-readable medium comprising instructions that when executed by a processor of an apparatus cause the apparatus to perform a method for displaying documents with context sensitivity for an improved user experience, such as method 400 (or any combination of the steps described above with respect to method 400).

Example Computing System

Figure 5:
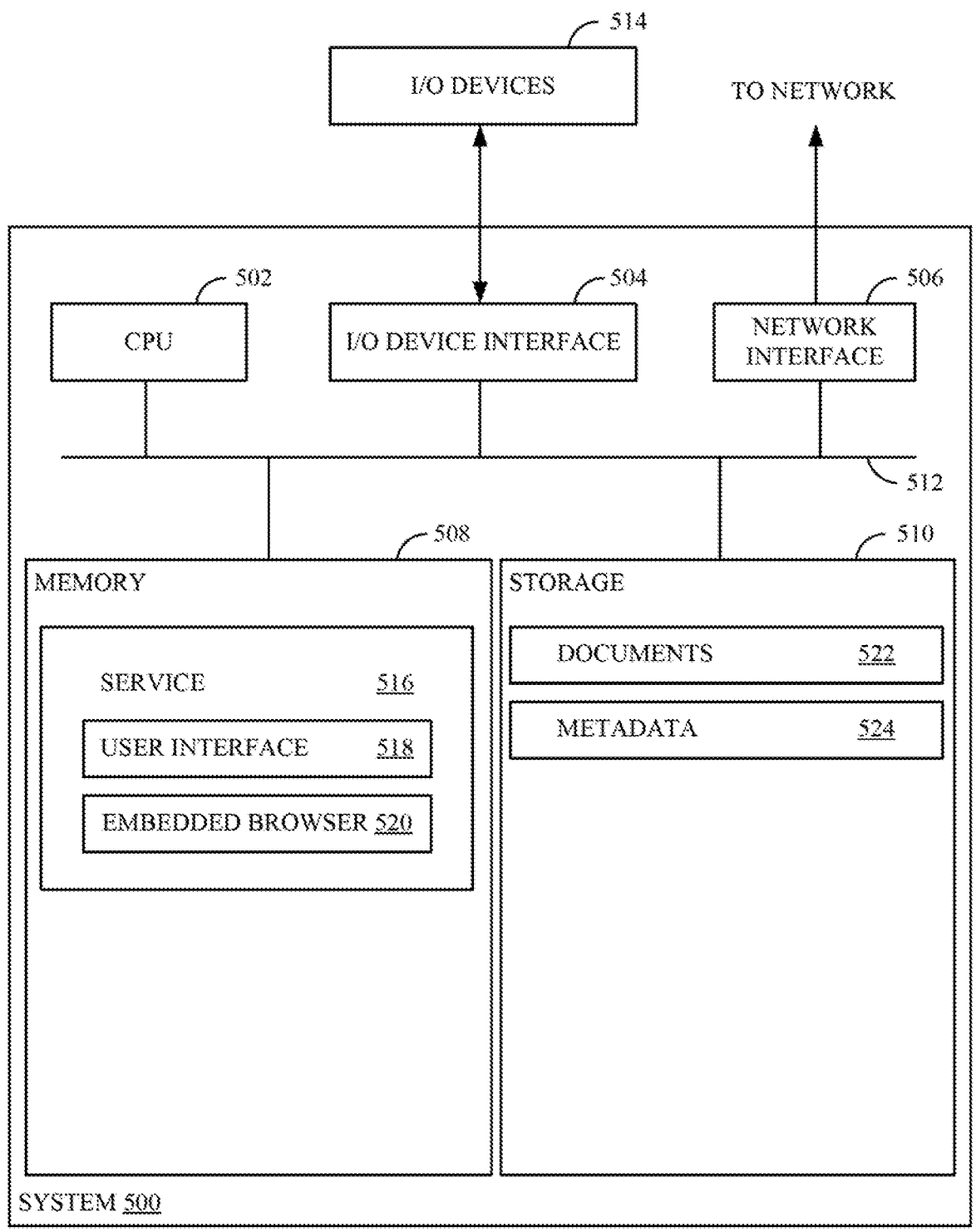
FIG. 5 depicts an example computer system with which embodiments of the present disclosure may be implemented.

FIG. 5 illustrates an example system 600 used for retrieval of data from documents.

As shown, system 500 includes a central processing unit (CPU) 502, one or more I/O device interfaces 504 that may allow for the connection of various I/O devices 514 (e.g., keyboards, displays, mouse devices, pen input, etc.) to the system 500, network interface 506, a memory 508, storage 510, and an interconnect 512. It is contemplated that one or more components of system 500 may be located remotely and accessed via a network. It is further contemplated that one or more components of system 500 may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510. CPU 502 is included to be representative of a single CPU, multiple CPUs, a single CPU having multiple processing cores, and other arrangements. Additionally, the memory 508 is included to be representative of a random access memory. Furthermore, the storage 510 may be a disk drive, solid state drive, or a collection of storage devices distributed across multiple storage systems. Although shown as a single unit, the storage 510 may be a combination of fixed and/or removable storage devices, such as fixed disc drives, removable memory cards or optical storage, network attached storage (NAS), or a storage area-network (SAN).

Storage 510 comprises documents 522 and metadata 524. For example, documents 522 may comprise documents that comprise informational content related to use of an application, such as the reference documents shown and described with respect to user interface element 116 of FIG. 1 and embedded browser 300 of FIG. 3. While documents 522 are depicted as being stored locally, it is noted that the documents may also be stored remotely (e.g., at a location accessible over a network, such as the Internet). Metadata 524 may map identifiers with context information identifying locations or "destinations" within documents. For example, metadata 524 may be representative of metadata 200 of FIG. 2.

As shown, memory 508 includes service 516, which may be representative of the service related to user interface 100 as described with respect to FIG. 1. Service 516 includes user interface 518, which may be representative of user interface 100 of FIG. 1, and embedded browser 520, which may be representative of embedded browser 300 of FIG. 3 and/or user interface component 116 of FIG. 1. For example, service 516 may perform operations related to context-sensitive display of reference for an improved user experience (e.g., as described with respect to FIGS. 1-4) using documents 522 and metadata 524.

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for improving a user experience of an application through context-sensitive display of reference documents, comprising:
   receiving, from a user via a user interface, a request for informational content related to a step in a workflow within the application;
   determining an identifier corresponding to a reference document associated with the step based on the request;
   retrieving the reference document based on the identifier;
   accessing, based on the identifier, metadata associated with the reference document to retrieve document position coordinates, a page number, and an automatic zoom percentage associated with the identifier, wherein the metadata is automatically generated based at least in part on electronic analysis of the reference document; and
   displaying a portion of the reference document to the user within the user interface based on the document position coordinates, wherein the portion of the reference document comprises the informational content.

2. The method of claim 1, wherein displaying the portion of the reference document comprises:
   determining a page of the reference document associated with the page number; and
   choosing a field of view for displaying the page based on the document position coordinates and the automatic zoom percentage.

3. The method of claim 1, wherein the portion of the reference document comprises instructions produced by an official entity related to the step, and wherein displaying the portion of the reference document comprises:
   navigating to the instructions in the reference document based on the document position coordinates; and
   displaying the instructions in a document format provided by the official entity.

4. The method of claim 3, further comprising:
   receiving, from the user via the user interface, a request to print the informational content; and
   printing the reference document in the document format provided by the official entity.

5. The method of claim 1, wherein:
   the workflow is related to completing a form related to a governmental entity, the step is associated with a field of the form,
the reference document comprises instructions provided by the governmental entity related to completing the form, and
the portion of the reference document comprises instructions related to the field.

6. The method of claim 1, wherein displaying the portion of the reference document comprises:
generating a uniform resource locator (URL) that includes the identifier; and
using the URL to display the portion of the reference document within an embedded browser of the user interface, wherein the portion of the reference document is determined based on the document position coordinates associated with the identifier included in the URL.

7. A non-transitory computer-readable medium comprising instructions that, when executed by one or more processors, cause the one or more processors to perform a method for improving a user experience of an application through context-sensitive display of reference documents, the method comprising:
receiving, from a user via a user interface, a request for informational content related to a step in a workflow within the application;
determining an identifier corresponding to a reference document associated with the step based on the request;
retrieving the reference document based on the identifier;
accessing, based on the identifier, metadata associated with the reference document to retrieve document position coordinates, a page number, and an automatic zoom percentage associated with the identifier, wherein the metadata is automatically generated based at least in part on electronic analysis of the reference document; and
displaying a portion of the reference document to the user within the user interface based on the document position coordinates, wherein the portion of the reference document comprises the informational content.

8. The non-transitory computer-readable medium of claim 7, wherein displaying the portion of the reference document comprises:
determining a page of the reference document associated with the page number; and
choosing a field of view for displaying the page based on the document position coordinates and the automatic zoom percentage.

9. The non-transitory computer-readable medium of claim 7, wherein the portion of the reference document comprises instructions produced by an official entity related to the step, and wherein displaying the portion of the reference document comprises:
navigating to the instructions in the reference document based on the document position coordinates; and
displaying the instructions in a document format provided by the official entity.

10. The non-transitory computer-readable medium of claim 9, wherein the method further comprises:
receiving, from the user via the user interface, a request to print the informational content; and
printing the reference document in the document format provided by the official entity.

11. The non-transitory computer-readable medium of claim 7, wherein:
the workflow is related to completing a form related to a governmental entity,
the step is associated with a field of the form,
the reference document comprises instructions provided by the governmental entity related to completing the form, and
the portion of the reference document comprises instructions related to the field.

12. The non-transitory computer-readable medium of claim 7, wherein displaying the portion of the reference document comprises:
generating a uniform resource locator (URL) that includes the identifier; and
using the URL to display the portion of the reference document within an embedded browser of the user interface, wherein the portion of the reference document is determined based on the document position coordinates associated with the identifier included in the URL.

13. A system, comprising:
a memory comprising computer-readable instructions; and
one or more processors configured to execute the computer-readable instructions and cause the system to:
receive, from a user via a user interface, a request for informational content related to a step in a workflow within an application;
determine an identifier corresponding to a reference document associated with the step based on the request;
retrieve the reference document based on the identifier;
access, based on the identifier, metadata associated with the reference document to retrieve document position coordinates, a page number, and an automatic zoom percentage associated with the identifier, wherein the metadata is automatically generated based at least in part on electronic analysis of the reference document; and
display a portion of the reference document to the user within the user interface based on the document position coordinates, wherein the portion of the reference document comprises the informational content.

14. The system of claim 13, wherein the one or more processors being configured to cause the system to display the portion of the reference document comprises the one or more processors being configured to cause the system to:
determine a page of the reference document associated with the page number; and
choose a field of view for displaying the page based on the document position coordinates and the automatic zoom percentage.

15. The system of claim 13, wherein the portion of the reference document comprises instructions produced by an official entity related to the step, and wherein the one or more processors being configured to cause the system to display the portion of the reference document comprises the one or more processors being configured to cause the system to:
navigate to the instructions in the reference document based on the document position coordinates; and
display the instructions in a document format provided by the official entity.

16. The system of claim 15, wherein the one or more processors are further configured to cause the system to:
receive, from the user via the user interface, a request to print the informational content; and
print the reference document in the document format provided by the official entity.

17. The system of claim 13, wherein:

the workflow is related to completing a form related to a governmental entity, the step is associated with a field of the form, the reference document comprises instructions provided by the governmental entity related to completing the form, and the portion of the reference document comprises instructions related to the field.

18. The method of claim 1, wherein the electronic analysis of the reference document comprises optical character recognition (OCR) techniques.

19. The non-transitory computer-readable medium of claim 7, wherein the electronic analysis of the reference document comprises optical character recognition (OCR) techniques.

20. The system of claim 13, wherein the electronic analysis of the reference document comprises optical character recognition (OCR) techniques.

\* \* \* \* \*